United States Patent Office 3,586,509
Patented June 22, 1971

3,586,509
LIPPMANN PHOTOGRAPHIC EMULSION WITH A NON-SENSITIZING DYE
Robert E. Kerwin, Westfield, N.J., assignor to Bell Telephone Laboratories, Incorporated, Murray Hill and Berkeley Heights, N.J.
No Drawing. Filed Sept. 17, 1968, Ser. No. 760,357
Int. Cl. G03c 1/10
U.S. Cl. 96—99      4 Claims

ABSTRACT OF THE DISCLOSURE

High resolution silver halide photographic emulsions containing a dye capable of absorbing radiation in the visible region of the spectrum have been found to limit effective exposure regions in the emulsion to the depth of focus of the optics employed and minimize fogging due to diffracted or scattered light.

---

This invention relates to photographic emulsions. More particularly, the present invention relates to high resolution silver halide photographic emulsions.

Photolithographic techniques for fabricating high resolution photographic masks are presently based upon the use of projection optical systems utilizing lenses corrected for light of 436 nanometers, step and repeat and the first reduction camera being prime examples of such systems.

Heretofore, the most satisfactory results have been attained with a commercially available high resolution recording medium comprising a 6 micron thick Lippmann type emulsion of small (less than 0.1 micron) silver chloride-silver bromide crystals in gelatin upon a flat glass substrate, the resolution limitation of such media as imposed by the developed grain size being less than 0.5 micron lines and spaces for a test object contrast of 1000 to 1. However, the use of projected images typically involves working in a system in which the depth of focus of fine lines is only a fraction of the total depth of the photosensitive emulsion, so causing recordation of both the focused and the defocused image.

Unfortunately, the result of the depth of focus being less than the emulsion thickness is that a fraction of the out of focus incident illumination will be recorded, thereby degrading both the resolution and the acuity of the image. This difficulty may effectively be avoided in the case of uniform image widths by closely controlling the exposure and development so that recording of the image will be clipped at a specific minimum intensity value. However, the intensity of illumination through fine slits near the diffraction limit varies as a function of line width so that for a lens of 0.33 NA, a focal plane image of a 0.75 micron line will have as the light intensity at its center only 69 percent of the intensity of an adjacent 3 micron line, such variation in light intensity in the image plane limiting the ability to clip by processing control without losing fine image detail. Additionally, cross-sectioning of the resultant emulsions reveals spurious recorded images which are attributed to the fact that sufficient light intensity exists in the region of overlap of light cones of projected line images to expose the emulsion above or below the focal plane, thereby giving rise to the impression of another set of lines. Although numerous suggestions have been made by prior art workers, none have proven to be entirely satisfactory.

In accordance with the present invention, the prior art problems as related to projection exposure are successfully obviated by limiting the effective actinic depth of a high resolution photographic emulsion to the top few microns of the emulsion. The inventive technique involves dyeing a high resolution silver halide emulsion with a non-sensitizing material capable of absorbing radiation in the visible portion of the spectrum, thereby limiting the effective exposure regions in the emulsion to the depth of focus of the optics employed and minimizing fogging due to diffracted or scattered light.

A general outline suitable for use in the preparation of high resolution photographic plates in accordance with the invention will now be given. The invention has been described largely in terms of dyes capable of absorbing light of 406 and 436 nanometers. However it will be understood that the description is merely illustrative and not limiting in nature. Certain operating parameters and ranges are indicated.

The first step in the practice of the present invention involves preparing a dyeing solution. As indicated, the dyes of interest may be selected from among non-sensitizing dyes capable of absorbing radiation in the visible portion of the spectrum. The term "non-sensitizing" as employed herein is defined as a dye which does not make a photographic emulsion sensitive to light in the region beyond which silver halides are capable of absorbing or increase its sensitivity in the region where silver halides absorb. The dyes of particular interest herein are tartrazine, metanil yellow and napthol yellow S. Non-sensitizing dyes suitable herein are listed in the Merck Index. In order to obtain the required optical density for these dyes they must be present in the dye solution in amounts as set forth in the following schedule:

| | Percent, by weight |
|---|---|
| Tartrazine | 0.2–0.5 |
| Metanil yellow | 0.02–0.05 |
| Napthol yellow S | 0.02–0.05 |

The minima set forth above are dictated by considerations relating to the attainment of the desired optical density. The maxima are not absolute. However, it has been determined that the use of appreciably greater amounts of these dyes results in no further enhancement in the properties of the resultant photographic plate.

The dye solution also contains from 0.01 to 0.03 percent, by weight, of a non-ionic wetting agent, such being present for the purpose of providing uniform wetting of the emulsion. The remainder of the dye solution comprises distilled water.

Following, the dye solution is filtered at least once through a conventional filter for the purpose of removing particulate material greater than 0.1 micron in size. The dye solution may then be stored until ready for use or it may be used immediately.

The photographic plates amenable to processing in the described manner comprise high resolution silver halide emulsions such as a typical Lippmann type emulsion of silver chloride-silver bromide crystals in gelatin on a flat glass substrate. For the purposes of the present invention, the term "high resolution" is defined in terms of granularity and refers to emulsions having a developed grain size less than 0.1 micron.

The next step in the dyeing process involves immersing the photographic plate in the dye solution. Immersion is continued for a time period within the range of 4–5 minutes, such being required in order to obtain the desired optical density. Immersion beyond the noted time period has not been found to further enhance the properties of the emulsion. Thereafter, the photographic plate is removed from the dye solution, drained and dried by suitable techniques and returned to dark storage until ready for exposure. During both the dyeing and drying processes, it is necessary to work under safelight conditions in order to avoid fogging during the pre-exposure handling.

Finally, the dyed photographic plate is exposed utilizing a projection optical system in which the lenses have been corrected for light of 436 nanometers and developing, fixing, and rinsing effected by conventional methods.

Examples of the present invention are set forth below. They are intended merely as illustrations and it is to be appreciated that the techniques described may be varied by one skilled in the art without departing from the spirit and scope of the invention.

EXAMPLE I (a) 100 cubic centimeters of a dye solution were prepared by adding tartrazine and an ethylene glycol non-ionic wetting agent to distilled water in amounts sufficient to yield a solution comprising 0.2 percent, by weight, tartrazine and 0.02 percent by weight wetting agent. The dye solution was filtered through a 0.1 micron filter and placed in a dyeing vessel. Then, under safelight conditions, a high resolution photographic plate, obtained from commercial sources, comprising a 6 micron thick Lippmann type emulsion of silver chloride-silver bromide crystals, less than 0.1 micron in size in gelatin on a flat glass substrate was immersed in the dye solution for 5 minutes with gentle stirring. The plate was next removed, drained and dried in a stream of filtered air for 15 minutes. Following, the dye plate was exposed to $1.0 \times 10^{-4}$ joules per square centimeter of light having a wavelength of 436 nanometers and developed, fixed, and rinsed by conventional techniques. Analysis of the developed plate revealed that there were no spurious images present or non-focused light recorded.

(b) The procedure described above was repeated for comparative purposes in the absence of the dye. The photographic plate was exposed to $2.5 \times 10^{-5}$ joules per square centimeter of light having a wavelength of 436 nanometers in order to result in a developed optical density equivalent to that of the above-described plate. Analysis of the developed plate revealed the presence of spurious and non-focused images.

EXAMPLE II (a) The procedure of Example I was repeated with the exception that the dye solution contained 0.02 percent, by weight, metanil yellow, 0.02 percent, by weight, ethylene glycol wetting agent, remainder distilled water. Analysis of the described plate revealed that there were no spurious images present or non-focused light recorded.

(b) The procedure described above was repeated with the exception that the dye was not present. Analysis of the developed plate revealed the presence of spurious and non-focused images.

What is claimed is:

1. High resolution silver chloride-silver bromide Lippman emulsion having a developed grain size less than 0.1 micron destined for use in projection optical systems, the effective actinic depth of said emulsion being limited by the incorporation therein of a dye selected from the group consisting of tartrazine, mentanil yellow and naphthol yellow S, said dye being capable of absorbing radiation in the visible region of the spectrum.

2. Emulsion in accordance with claim 1 wherein said dye is tartrazine.

3. Emulsion in accordance with claim 1 wherein said dye is metanil yellow.

4. Emulsion in accordance with claim 1 wherein said dye is napthol yellow S.

References Cited

UNITED STATES PATENTS 3,485,627    12/1969    Hellmig _____ 96—9

OTHER REFERENCES

Lippmann's Process of Colour Photography—The British Journal of Photography, vol. 42, page 342 (1895).

NORMAN G. TORCHIN, Primary Examiner

W. H. LOUIE, JR., Assistant Examiner